(12) United States Patent
Rezvani et al.

(10) Patent No.: US 11,677,912 B2
(45) Date of Patent: Jun. 13, 2023

(54) ROBOT SENSOR INSTALLATION

(71) Applicant: Alarm.com Incorporated, Tysons, VA (US)

(72) Inventors: Babak Rezvani, Tysons, VA (US); Donald Gerard Madden, Columbia, MD (US); Glenn Tournier, Tysons, VA (US); Ahmad Seyfi, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 313 days.

(21) Appl. No.: 17/078,790

(22) Filed: Oct. 23, 2020

(65) Prior Publication Data

US 2021/0127092 A1    Apr. 29, 2021

Related U.S. Application Data

(60) Provisional application No. 62/924,865, filed on Oct. 23, 2019.

(51) Int. Cl.
| | |
|---|---|
| *G05D 1/00* | (2006.01) |
| *B64C 39/02* | (2023.01) |
| *H04N 7/00* | (2011.01) |
| *G01C 21/00* | (2006.01) |
| *H04N 7/18* | (2006.01) |
| *H04N 23/951* | (2023.01) |
| *B64U 101/30* | (2023.01) |

(52) U.S. Cl.
CPC ........... *H04N 7/183* (2013.01); *B64C 39/024* (2013.01); *G05D 1/0038* (2013.01); *G05D 1/0094* (2013.01); *H04N 23/951* (2023.01); *B64U 2101/30* (2023.01); *G01C 21/383* (2020.08); *G01C 21/3848* (2020.08)

(58) Field of Classification Search
CPC .... H04N 7/183; H04N 5/23232; H04N 5/217; H04N 5/23238; H04N 5/23206; H04N 5/00; B64C 39/024; B64C 2201/123; B64C 39/02; G05D 1/0038; G05D 1/0094; G05D 1/00; G01C 21/383; G01C 21/3848; G01C 21/00; G01C 21/38
See application file for complete search history.

(56) References Cited

U.S. PATENT DOCUMENTS

| | | | |
|---|---|---|---|
| 9,876,959 B2* | 1/2018 | Eline | H04N 5/2257 |
| 10,176,378 B1* | 1/2019 | Boyd | G06V 20/17 |
| 10,642,264 B2 | 5/2020 | Sentosa et al. | |
| 10,669,025 B1 | 6/2020 | Flick | |
| 2017/0187993 A1 | 6/2017 | Martch et al. | |
| 2019/0063881 A1* | 2/2019 | Abramov | F41H 11/02 |
| 2019/0217131 A1* | 7/2019 | Zechlin | G06V 20/20 |
| 2019/0369613 A1* | 12/2019 | Moon | B64C 39/024 |
| 2020/0160733 A1* | 5/2020 | Dick | B64C 39/024 |

* cited by examiner

*Primary Examiner* — Yonel Beaulieu
(74) *Attorney, Agent, or Firm* — Fish & Richardson P.C.

(57) ABSTRACT

Methods, systems, and apparatus a drone for installing sensors. A method includes determining to emulate a view of a camera at a particular location with a drone, deploying the drone to the particular location, obtaining an image captured by a drone, and emulating the view of the camera with the image.

20 Claims, 3 Drawing Sheets

ROBOT SENSOR INSTALLATION

CROSS-REFERENCE TO RELATED APPLICATION

This application claims the benefit of U.S. Application Ser. No. 62/924,865 filed on Oct. 23, 2019, which is incorporated herein by reference in its entirety.

BRIEF DESCRIPTION OF THE DRAWINGS

Like reference numbers and designations in the various drawings indicate like elements.

DETAILED DESCRIPTION

Installation of security systems can be a time consuming process and often requires the use of ladders to install cameras, smoke detectors, motion sensors, and other equipment on high ceilings and eaves, to name a few examples. Performing installation at construction time has benefits over retrofitting, but requires a significant outlay of equipment that the ultimate buyer may consider superfluous, and may still require configuration and setup upon later activation. In addition, batteries can degrade over time and equipment can be damaged. As a result, installation is probably delayed to a point where installation becomes mostly an independent step to install everything other than wiring.

Additionally, maintenance and upgrades can be as time consuming as the initial installation. In order to remedy the aforementioned issues associated with installation of security systems, the specification describes techniques for using a drone to perform an automated installation of a security and automation system in a property. The drone is capable of planning an installation, acting as a surrogate sensor, performing an initial installation, performing maintenance tasks such as, for example, upgrading firmware, replacing batteries, upgrading equipment at the property, and removing equipment at the property.

Drones can assist with planning installations at properties by surveying the property. In some implementations, the drone utilizes a combination of sensors and algorithms to construct a navigable three dimensional (3-D) map of the property. The drone constructs the navigable 3-D map of the property as it surveys the property. In some cases, the drone may include flight-based drones or ground-based drones. When the drone is deployed, the drone can survey the property. During the drone's surveying of the property, the drone can locate doorways, windows, and other features relevant to the installation. In some cases, a builder, owner of the property, or (human) installer may have pre-installed certain components, such as a panel or certain sensors, mounting plates or brackets, see Initial Install discussion below, or other features, e.g., outlets, screws or metal studs within the drywall in the property that can be noteworthy.

In some implementations, the drone detects these features at the property using computer vision, radio, or ferrous metal detection, and the position or location at which these features are located are added to the 3-D map. In some cases, the builder, installer, or owner may place visual or radio tags, such as a sticker with an April Tag, at the features within the property which can be discoverable by the drone during the survey. For example, a sticker with an April Tag may be part of a mounting plate. When the sticker is detected by the drone, the sticker signals to the drone that the corresponding equipment should or should not be installed in a specific location at the property. In some cases, the sticker shows the drone where the user wants the panel to be located in the property. In some cases, infrared or NFC tags could be detected by the drone. The infrared or NFC tags could be activated by a unique signature IR tag with a coin cell or other small, low powered battery device. For example, a camera mounts flash once per second at 900 nm, repeaters flash once per two seconds at 860 nm. The infrared sensors on the drone can detect these unique time and/or frequency signature from the camera.

Given this populated navigable 3-D map, a number of user-selected options, such as features to support and general use cases, sensor parameters, general constraints, and heuristics, the system can generate an optimized install plan and parts sheet. The system can provide the navigable 3-D map, the optimized install plan, and the parts sheet to the installer for approval. The system can identify issues with the install ahead of time—for example, when the user wants video coverage of a certain area at the property, but no mounting point exists at the property in the spots which will provide the best field of view. In response, the system can alert the installer of the lacking mounting point at the spot corresponding to the best field of view. The system can also alert the installer to other issues associated with the installation plan. This survey could be conducted before construction is finished in order to validate that a given installation is supported by the infrastructure before construction is complete.

A drone can act as a surrogate device during the installation. In some cases, an installer would find it is useful to demonstrate or test the capabilities of a sensor before installing it. For example, the system can model a field of view (FOV) of a camera on a 3D map at the property, and produce a simulated field of view. However, in some cases, the 3-D map varies significantly enough from reality that a real-world test would be more accurate. For example, the real-world test may be preferred in the case that a difficult-to-model stand of trees is nearby a FOV. In this case, a real-world test would be more accurate. Alternatively, the customer or owner may prefer to perform a real-world test so as to be convinced prior to outlay of capital. In this case of the real world test, a drone can be deployed for flying to the proposed location of the sensor in question and act as a stand-in, e.g., a surrogate device. For example, the drone would use its own camera to emulate a fixed camera installed in the eaves of a home. The feed from the drone's camera can be provided to the system, e.g., a control unit at the monitored property, digitally processed to match characteristics of a camera that would be placed at that location. The characteristics of the camera can include, for example, a field of view, a resolution, distortion characteristics, and others. Alternatively, the drone can be equipped with an identical camera sensor. The drone can hover for a period of time at each position to capture sample video. In some cases, the drone can affix itself to the place in much the same fashion that it performs the "initial installation" of equipment, as described below. The drone can be equipped with any manner of surrogate sensor hardware that include, for example, smoke detectors, motion detectors, microphones, temperature and humidity sensors, etc.

In some implementations, the drone can automatically capture data from many install points throughout the property during its initial survey and combine this data with the installation plan described above. In doing this, users can preview video or other data, e.g., the navigable 3-D map, to aid in final selection of installation points. Data collected from multiple points might be used to simulated intermediate sensor positions—for example a $3^{rd}$ camera angle could be simulated via re-projection in between 2 points where the drone collected data.

The drone can also evaluate mesh a network performance before or during installation. For example, the drone would include appropriate radios built in, and can position itself as a device to test signal strength in a certain area of the property. If the signal was weak at a particular location within or in proximity to the property, the drone can identify the optimal point(s) to add repeaters to the property based on the map, and then fly to each point of optimal point(s) to test the signal. In some cases, the design could be verified by temporarily installing a repeater or another device at that location and then flying the drone to that location to determine if the signal strength has improved.

The drone can perform an initial install. Installation of equipment needs to be relatively simple. The drone's ability to exert force or manipulate complex mechanisms is limited and will tax battery power. Therefore, most installed equipment at the property will need to be battery powered and communicate wirelessly with the system. As such, no electrical connections are necessary. Based on the battery powered devices, the installation can be accomplished in one of several ways:

In a first example, the installed equipment employs a magnetic mount which can attach to ferrous structures in the property. The drone uses a ferrous metal detector to locate these points, e.g., ferrous structures, in the building. For example, common points might be hidden drywall screws in walls and ceilings, surface mounted metal plates, or recessed metal plates installed ahead of time for this intended purpose. The magnets would be strong enough to hold the equipment in place, but allow the drone to still twist or slide the device for repositioning or removal.

In a second example, the installed equipment can employ a ferrous mount which attaches to magnetic mounting plates pre-installed at the property. The drone can use a magnetometer to locate the ferrous mounts if recessed.

In a third example, the drone can use an adhesive pad to mount the device to any flat surface. The pad can have a thickness of two layers and can include a touch fastener holding them together for future replacement.

In a fourth example, the device can mount to a specialty mounting plate with a tapered socket. The tapered socket can include a spring-loaded locking mechanism, which is similar to a common automotive seatbelt buckle where the spring lock is included in the female side, or a telephone plug where the spring lock is included on the male side. In this case, the drone pushes the device into place, the latch locks, and the device is secure. Additionally, the drone can remove the device by depressing a release lever on the mounting plate or device. Alternatively, a similar solution might include a tapered socket with a quarter-turn locking mechanism, where the drone can rotate the object through 90 degrees in order to install or uninstall.

In some cases, a pre-installed mounting plate may contain electrical contacts. In the socket case, plenty of examples exist for providing electrical and mechanical connections. In a magnetic mount, the magnets on each surface and magnetic polarity can be used to ensure the device lines up correctly with the connectors. Alternatively, mechanical guides can be employed to slide the device into place once within close proximity.

In some implementations, the drone can select the device from a selection of inventory, grip the device, and fly the device to the install location at the property. Two main orientations can exist for most equipment—a wall-mount or a ceiling-mount. Based on these two main orientations, the drone may have two attachment points for attaching equipment—one attachment point above the drone in ceilings and another attachment point on a side wall. For example, the drone would pick the parts from a rack, where the parts would be mounted either on a ceiling or on a wall in much the same way as they would during installation. The drone would remove the parts from the rack in the same manner as if the drone was uninstalling the part.

In some implementations, the drone can incorporate a very simple one-axis mechanical arm that is configured to rotate 180 degrees from nadir to zenith. Although this one-axis mechanical arm adds mechanical complexity to the drone, the one-axis mechanical arm offers the drone a benefit of allowing the devices to be oriented in a simpler rack or even placed on a table to be picked up from above.

The drone can also pick up the device when the device lies in a horizontal or nadir position with a fixed gripper, and, depending on the drone's flight characteristics, be able to invert or pitch itself to raise the device 90-180 degrees, and thus, removing the complexity of the one-axis mechanical arm.

In some implementations, the drone can grip the part using a simple gripper designed to accommodate the inventory of parts to install. The parts might also incorporate a mechanical interface similar to the socket described above (released mechanically), or a magnetic interface (released mechanically or overcome by the greater strength of the installed mount).

In some instances, the device might be preinstalled at construction time, but protected by a cover, or require a tab to be removed to connect the batteries. This cover or tab might incorporate a small visual marker to identify it as such, and a small magnet or interface point for the drone to grip. The drone would fly to each sensor, remove the cover/tab, register the device, activate the device, test the device, and return the cover/tab to a rack or pile before repeating with the next sensor. This will be further described below.

The drone can perform registration, activation, configuration, testing, and firmware updates during installation. As the drone selects each device to install at the property, the drone notes the ID of the device using a QR code, an OCR, or a radio exchange, to name a few examples. Upon install, the drone registers the device with the rest of the system. In response, the system then can update a map with the pose of the new sensor recently installed. The sensor can also be powered on, configured, have its firmware updated, diagnostics run, and added to a network at the property. In some implementations, the drone can carry an NFC tag that contains the room name or desired location for placing the device. Then, at the time of installing the device, the data from the NFC tag can be installed into the device. In this case, the drone includes prior knowledge where to place the device and what an identification of the device. In some cases, the drone can carry multiple NFC tags, one tag for each device it carries for what to name or program into the device.

The drone can perform physical tests associated with the sensor. One test, for example, can include the drone flying through the FOV of a camera to make sure the camera can view the drone. These maintenance functions could be conducted with a low-power, short-range radio connection to a low-level processor such that even if the rest of the device were powered down, or if the device was in a 'bricked' state, the drone could securely connect with the device locally and perform diagnostics, updates, and configuration on the bricked device. In some cases, these maintenance functions could take place at the time of installation due to issues when installing firmware that require local maintenance, or to obtain diagnostics of an unknown issue that takes equipment offline.

The drone can replace batteries and remove equipment. If these devices at the property are battery powered, eventually many of the devices will require battery replacements. The battery replacements can be performed by removing the device and replacing it with a fresh one, e.g., essentially reinstalling a new sensor in place, or by removing one battery pack and installing a new battery pack.

Removing the devices with a drone can be performed. For example, the drone can navigate to a location of the device that is required to be removed, identify the device visually and/or via the radio connection as previously described, and notify the device, system, or installer that the device is about to be removed. The drone identifies the pose of the device (perhaps, using markers on the device) and in response, calculates the drone's required pose and approach it must take to secure the device. The drone can predetermine a pose and approach for each device model in the property, and store this information as a drone model pair in the system. Once the drone secures device, the drone removes the device depending on the mount.

In some implementations, the drone removes magnetic devices by either sliding the device laterally off the mount or tipping the device to lever the magnetic connection apart. In some cases, mechanical devices will be removed by disengaging the lock. In some cases, touch fasteners would be levered apart. Additionally, batteries in devices would be designed as slide-in packs. The drone would grip the battery, disengage a mechanical lock (or overcome a mild magnet) holding the battery in place, and then slide the pack away from the device.

Figure 1:
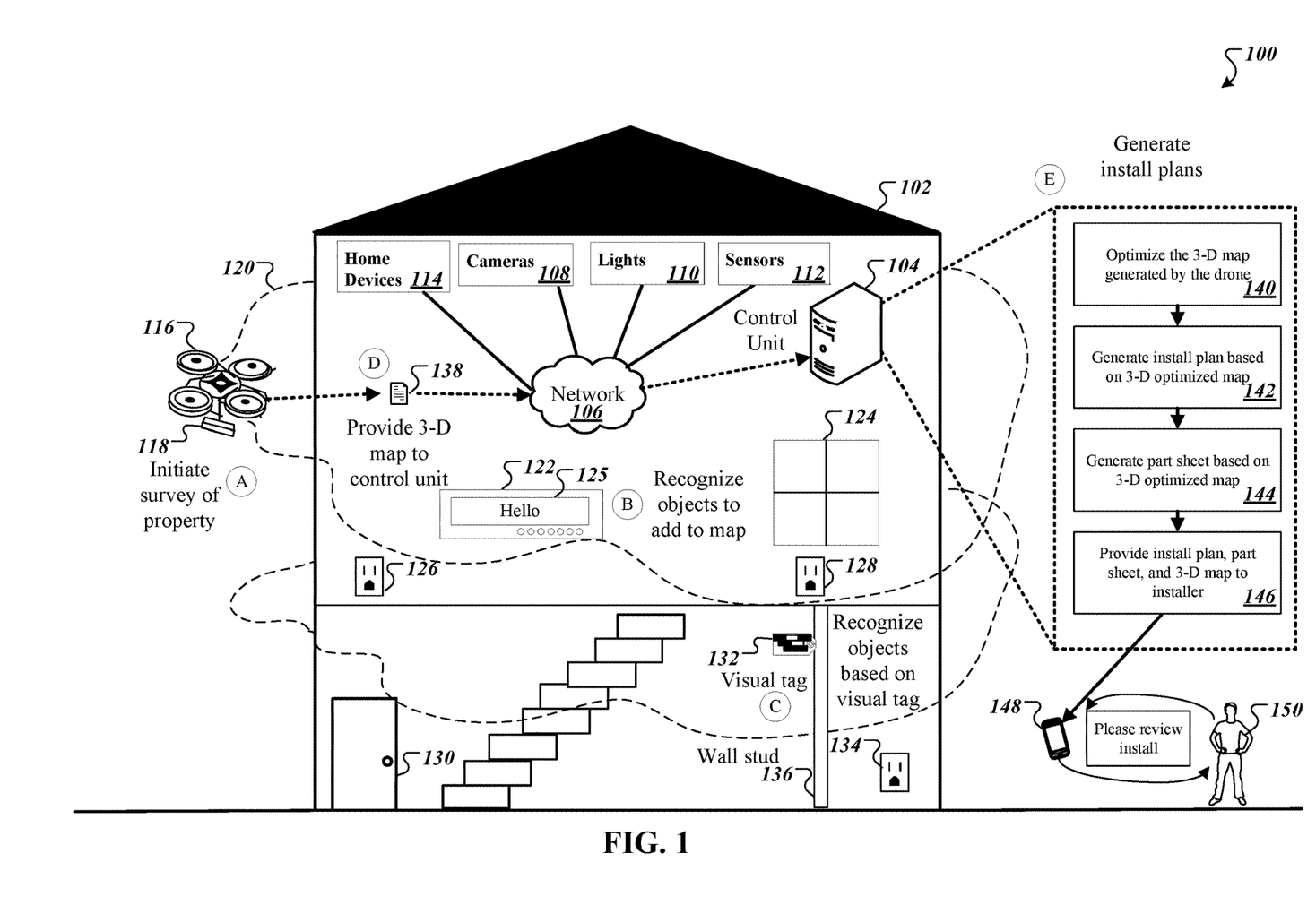
FIG. 1 is a contextual diagram of an example monitoring system that includes a drone for installing a security system at a monitored property.

FIG. 1 is a contextual diagram of an example system 100 for connecting one or more devices to communicate with smart connection modules. The system 100 includes a monitored property 102 and one or more devices for monitoring the property 102. For example, the property 102 includes a control unit server 104, a network 106, one or more cameras 108, lights 110, sensors 112, home devices 114, security panel 122, drone 116, and client device 148 of an installer 150. A subset of these components can be included in system 100 or additional components that fall within the scope of the present disclosure.

As shown in FIG. 1, a monitored property 102 is monitored by a control unit server 104 that includes components within the monitored property 102. The components within the monitored property 102 may include one or more cameras 108, one or more lights 110, one or more sensors 112, one or more home devices 114, and the security panel 122, to name a few examples. The one or more cameras 108 may include video cameras that are located at the exterior and interior of the monitored property 102, such as near the front door 130 or on the roof of the monitored property 102. The one or more sensors 112 may include one or more motion sensors, contact sensors, and lock sensors. The sensors 112 can be associated with the doors, the windows, and other components within the property 102. The one or more home devices 114 may include home appliances such as a washing machine, a dryer, a dishwasher, an oven a stove, a microwave, and a laptop, to name a few examples. The security panel 122 may receive one or more messages from the control unit server 104, from the sensors 112, or from the client device 148. The security panel 122 can display the receive messages on the display 125.

The control unit server 104 communicates over the network 106, which can be a short-range wired or a wireless network, to each of the cameras 108, the lights 110, the sensors 112, the home devices 114, and the security panel 122. Additionally, the control unit server 104 can communicate with one or more drones, such as drone 116, over network 106. The drone may be docked at a charging station located at the monitored property. In some implementations, the control unit server 104 may detect when the drone 116 has departed from the docking station. The drone 116 can fly around the monitored property 102 to survey the property 102.

For example, as illustrated in FIG. 1, during stage (A), the installer 150 can indicate to the drone 116 to initiate surveying the monitored property 102. The drone 116, which includes an additional device 118, surveys the monitored property 102 for generating a navigational three-dimensional (3-D) map of the monitored property 102. The additional device 118 can include one or more of a camera device, various sensors, a mechanical arm, a grappler, or a magnet, to name a few examples. The drone 116 can follow a predetermined path around the monitored property 102 or fly around a random path 120 and learn the property 102 as it surveys.

As the drone 116 navigates the property 102, the drone 116 generates the 3-D map of the property 102. The 3-D map is generated based on data provided by the additional device 118, such as a video stream, proximity data, media, and infrared data. In some implementations, the drone 116 stores the 3-D map and data from the additional device 118 internally. In some implementations, the drone 116 transmits the data from the additional device 118 to the control unit server 104 as the drone 116 surveys the property 102, where the 3-D map is generated based on the data.

During stage (B), the drone 116 recognizes objects in the monitored property 102. For example, the drone 116 recognizes the security panel 122, one or more windows, e.g., window 124, outlets 126, 128, and 134, and the control unit server 104. The drone 116 adds a location corresponding to each of the detected objects in the monitored property 102 to the generated map. In some implementations, the drone 116 adds the location and data identifying the detected object to the generated 3-D map. The data identifying the detected object can include media, a tag, an identifier, or some other identifiable information.

During stage (C), the drone 116 recognizes an identifier that corresponds to an object in the monitored property 102. For example, the identifier can correspond to a visual tag 132 added by the installer 150, that indicates whether device corresponding to the visual tag 132, e.g., the wall stud 136, should or should not be added to the generated 3-D map. In some examples, the identifier can correspond to other representations, such as a known GPS location for the drone 116 to fly to for identifying an object, or can include a QR code for identifying the corresponding object and whether it should be added to the 3-D map.

After the drone 116 has completed surveying the monitored property 102, the drone 116 packages the 3-D map in a form suitable for transmitting and transmits the packaged 3-D map 138 to the control unit server 104 during stage (D).

The drone 116 transmits the packaged 3-D map 138 to the control unit server 104 over network 106. Alternatively, the drone 116 returns to the docking station, where it notifies the installer 150 that the 3-D map 138 is ready to be transferred. The installer 150 may indicate through its client device 148 for the 3-D map 138 to be transferred to the control unit server 104.

During stage (E), the control unit server 104 receives the packaged 3-D map 138 over the network 106 and processes the packaged 3-D map 138. In particular, the control unit server 104 optimizes the 3-D map generated by the drone 116 in 140. The optimization can include sharpening the resolution of the media within the 3-D map 138, storing the 3-D map 138, determining whether all locations of the monitored property 102 were covered, and indicating to the installer 150 that the 3-D map is ready for review. Other steps are also possible during the optimization step.

Once the 3-D map has been optimized, the control unit server 104 generates an installation plan based on the 3-D optimized map in 142. The installation plan can be generated based on a number of user-selected options, e.g., features to support and general use-cases, sensor parameters, general constraints, and heuristics from the optimized 3-D map. The installation plan is based on the objects recognized in the monitored property 102 and their corresponding location. For example, the objects recognized in the monitored property 102 can include (i) already installed equipment, (ii) installed markers or mounting points, and (iii) existing "natural" features of the property, e.g., outlets, ferrous points which could include mounting points, doors, and windows. This allows users to determine whether installing devices at certain locations of the property 102 is possible based on identified objects and their corresponding identified locations within the property 102.

In 144, the control unit server 104 generates a part sheet based on the 3-D optimized map and the generated installation plan. The part sheet can include, for example, one or more objects found at the property, devices the control unit server 104 recommends to be installed at certain points within the monitored property 102, and devices recommended by the installer 150 to be installed at the monitored property 102. In some implementations, the control unit server 104 can indicate within the part sheet locations at which particular devices are recommended to be installed within the monitored property 102.

In 146, the control unit server 104 provides the installation plan, the part sheet, and the generated 3-D map to the client device 148 of the installer 150. In some implementations, the control unit server 104 transmits the installation plan, the part sheet, and the generated 3-D to the security panel 122 for the installer 150 to review. In some implementations, the control unit server 104 provides the installation plan, the part sheet, and the generated map for the installer 150 to review before any installation work is performed at the property 102. In other implementations, the control unit server 104 can provide each of these components during or after installation. The installer 150 can review and analyze these plans to make informed installation decisions.

The operations of stages (A) to (E) illustrate one or more iterations of generating and providing an installation plan, a part sheet, and a 3-D navigable map of the property 102 to the installer 150. The control unit server 104 can repeat the operations of (A) to (E) for many other iterations. In some implementations, the control unit server 104 may perform the operations illustrated in FIG. 1 simultaneously for various drones surveying the monitored property 102. In some implementations, the installer 150 may include a bin or a rock of components used to provide objects described in the part sheet. An automated component, such as a mechanical arm, may retrieve a component from the bin and present it to the drone for pickup. Other automated components are also possible for presenting to the drone.

Figure 2:
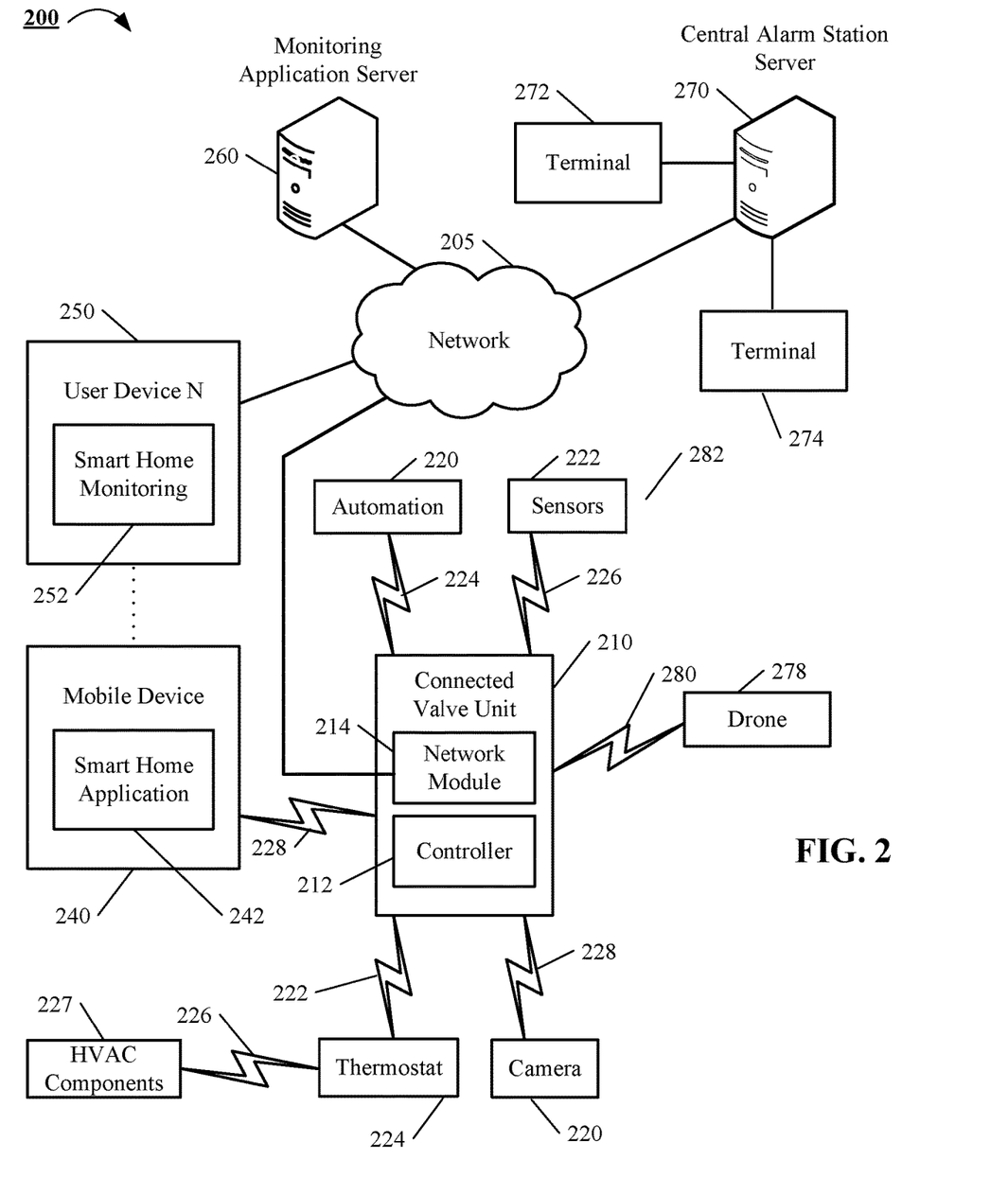
FIG. 2 is block diagram of an example monitoring system.

FIG. 2 is a block diagram of an example system 200 for cataloging objects at a monitored property that may utilize one or more various components. The electronic system 200 includes a network 205, a control unit 210, one or more user devices 240 and 250, a monitoring application server 260, and a central alarm station server 270. In some examples, the network 205 facilitates communications between the control unit 210, the one or more user devices 240 and 250, the monitoring application server 260, and the central alarm station server 270.

The network 205 is configured to enable exchange of electronic communications between devices connected to the network 205. For example, the network 205 may be configured to enable exchange of electronic communications between the control unit 210, the one or more user devices 240 and 250, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The control unit 210 includes a controller 212 and a network module 214. The controller 212 is configured to control a control unit monitoring system (e.g., a control unit system) that includes the control unit 210. In some examples, the controller 212 may include a processor or other control circuitry configured to execute instructions of a program that controls operation of a control unit system. In these examples, the controller 212 may be configured to receive input from sensors, flow meters, or other devices included in the control unit system and control operations of devices included in the household (e.g., speakers, lights, doors, etc.). For example, the controller 212 may be configured to control operation of the network module 214 included in the control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the control unit 210 to communicate over a local area network and/or the Internet. The network module 214 also may be a voiceband modem configured to enable the alarm panel to communicate over the telephone lines of Plain Old Telephone Systems (POTS).

The control unit system that includes the control unit 210 includes one or more sensors. For example, the monitoring system may include multiple sensors 220. The sensors 220 may include a lock sensor, a contact sensor, a motion sensor, or any other type of sensor included in a control unit system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The control unit 210 communicates with the module 222 and the camera 230 to perform monitoring. The module 222 is connected to one or more devices that enable home automation control. For instance, the module 222 may be connected to one or more lighting systems and may be configured to control operation of the one or more lighting systems. Also, the module 222 may be connected to one or more electronic locks at the property and may be configured to control operation of the one or more electronic locks (e.g., control Z-Wave locks using wireless communications in the Z-Wave protocol. Further, the module 222 may be connected to one or more appliances at the property and may be configured to control operation of the one or more appliances. The module 222 may include multiple modules that are each specific to the type of device being controlled in an automated manner. The module 222 may control the one or more devices based on commands received from the control unit 210. For instance, the module 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building or within a residential property 102 monitored by the control unit 210. The camera 230 may be configured to capture single, static images of the area and also video images of the area in which multiple images of the area are captured at a relatively high frequency (e.g., thirty images per second). The camera 230 may be controlled based on commands received from the control unit 210.

The camera 230 may be triggered by several different types of techniques. For instance, a Passive Infra-Red (PIR) motion sensor may be built into the camera 230 and used to trigger the camera 230 to capture one or more images when motion is detected. The camera 230 also may include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a command to capture an image when external devices detect motion or another potential alarm event. The camera 230 may receive the command from the controller 212 or directly from one of the sensors 220.

In some examples, the camera 230 triggers integrated or external illuminators (e.g., Infra-Red, Z-wave controlled "white" lights, lights controlled by the module 222, etc.) to improve image quality when the scene is dark. An integrated or separate light sensor may be used to determine if illumination is desired and may result in increased image quality.

The camera 230 may be programmed with any combination of time/day schedules, system "arming state," or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the control unit 210. The camera 230 may employ a small solar cell to recharge the battery when light is available. Alternatively, the camera 230 may be powered by the controller's 212 power supply if the camera 230 is co-located with the controller 212.

In some implementations, the camera 230 communicates directly with the monitoring application server 260 over the Internet. In these implementations, image data captured by the camera 230 does not pass through the control unit 210 and the camera 230 receives commands related to operation from the monitoring application server 260.

The system 200 also includes thermostat 234 to perform dynamic environmental control at the property. The thermostat 234 is configured to monitor temperature and/or energy consumption of an HVAC system associated with the thermostat 234, and is further configured to provide control of environmental (e.g., temperature) settings. In some implementations, the thermostat 234 can additionally or alternatively receive data relating to activity at a property and/or environmental data at a property, e.g., at various locations indoors and outdoors at the property. The thermostat 234 can directly measure energy consumption of the HVAC system associated with the thermostat, or can estimate energy consumption of the HVAC system associated with the thermostat 234, for example, based on detected usage of one or more components of the HVAC system associated with the thermostat 234. The thermostat 234 can communicate temperature and/or energy-monitoring information to or from the control unit 210 and can control the environmental (e.g., temperature) settings based on commands received from the control unit 210.

In some implementations, the thermostat 234 is a dynamically programmable thermostat and can be integrated with the control unit 210. For example, the dynamically programmable thermostat 234 can include the control unit 210, e.g., as an internal component to the dynamically programmable thermostat 234. In addition, the control unit 210 can be a gateway device that communicates with the dynamically programmable thermostat 234.

A module 237 is connected to one or more components of an HVAC system associated with a property, and is configured to control operation of the one or more components of the HVAC system. In some implementations, the module 237 is also configured to monitor energy consumption of the HVAC system components, for example, by directly measuring the energy consumption of the HVAC system components or by estimating the energy usage of the one or more HVAC system components based on detecting usage of components of the HVAC system. The module 237 can communicate energy-monitoring information and the state of the HVAC system components to the thermostat 234 and can control the one or more components of the HVAC system based on commands received from the thermostat 234.

In some examples, the system 200 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones, such as drone 278, may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 200 for use in appropriate circumstances. For instance, a robotic vacuum cleaner device may be associated with the monitoring system 200 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 210, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 200 MHz wireless communication module that enables the robotic devices to communicate directly with the control unit 210. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 200. For instance, after completion of a monitoring operation or upon instruction by the control unit 210, the robotic devices may be configured to automatically fly to and land on one of the charging stations. In this regard, the robotic devices may automatically maintain a fully charged battery in a state in which the robotic devices are ready for use by the monitoring system 200.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 210 references a stored table of the occupancy status of each charging station and instructs the robotic device to navigate to the nearest charging station that is unoccupied.

The sensors 220, the module 222, the camera 230, the drone 278, and the thermostat 234 communicate with the controller 212 over communication links 224, 226, 228, 232, and 280. The communication links 224, 226, 228, 232, and 280 may be a wired or wireless data pathway configured to transmit signals from the sensors 220, the module 222, the camera 230, the drone 278, and the thermostat 234 to the controller 212. The sensors 220, the module 222, the camera 230, the drone 278, and the thermostat 234, may continuously transmit sensed values to the controller 212, periodically transmit sensed values to the controller 212, or transmit sensed values to the controller 212 in response to a change in a sensed value.

The communication links 224, 226, 228, 232, and 280 may include a local network. The sensors 220, the module 222, the camera 230, the thermostat 234, the drone 278, and the controller 212 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 2 (CAT6) wired Ethernet network. The local network may be a mesh network constructed based on the devices connected to the mesh network.

The monitoring application server 260 is an electronic device configured to provide monitoring services by exchanging electronic communications with the control unit 210, the one or more user devices 240 and 250, and the central alarm station server 270 over the network 205. For example, the monitoring application server 260 may be configured to monitor events (e.g., alarm events) generated by the control unit 210. In this example, the monitoring application server 260 may exchange electronic communications with the network module 214 included in the control unit 210 to receive information regarding events (e.g., alerts) detected by the control unit server 104. The monitoring application server 260 also may receive information regarding events (e.g., alerts) from the one or more user devices 240 and 250.

In some examples, the monitoring application server 260 may route alert data received from the network module 214 or the one or more user devices 240 and 250 to the central alarm station server 270. For example, the monitoring application server 260 may transmit the alert data to the central alarm station server 270 over the network 205.

The monitoring application server 260 may store sensor and image data received from the monitoring system and perform analysis of sensor and image data received from the monitoring system. Based on the analysis, the monitoring application server 260 may communicate with and control aspects of the control unit 210 or the one or more user devices 240 and 250.

The central alarm station server 270 is an electronic device configured to provide alarm monitoring service by exchanging communications with the control unit 210, the one or more mobile devices 240 and 250, and the monitoring application server 260 over the network 205. For example, the central alarm station server 270 may be configured to monitor alerting events generated by the control unit 210. In this example, the central alarm station server 270 may exchange communications with the network module 214 included in the control unit 210 to receive information regarding alerting events detected by the control unit 210. The central alarm station server 270 also may receive information regarding alerting events from the one or more mobile devices 240 and 250 and/or the monitoring application server 260.

The central alarm station server 270 is connected to multiple terminals 272 and 274. The terminals 272 and 274 may be used by operators to process alerting events. For example, the central alarm station server 270 may route alerting data to the terminals 272 and 274 to enable an operator to process the alerting data. The terminals 272 and 274 may include general-purpose computers (e.g., desktop personal computers, workstations, or laptop computers) that are configured to receive alerting data from a server in the central alarm station server 270 and render a display of information based on the alerting data. For instance, the controller 212 may control the network module 214 to transmit, to the central alarm station server 270, alerting data indicating that a sensor 220 detected motion from a motion sensor via the sensors 220. The central alarm station server 270 may receive the alerting data and route the alerting data to the terminal 272 for processing by an operator associated with the terminal 272. The terminal 272 may render a display to the operator that includes information associated with the alerting event (e.g., the lock sensor data, the motion sensor data, the contact sensor data, etc.) and the operator may handle the alerting event based on the displayed information.

In some implementations, the terminals 272 and 274 may be mobile devices or devices designed for a specific function. Although FIG. 6 illustrates two terminals for brevity, actual implementations may include more (and, perhaps, many more) terminals.

The one or more user devices 240 and 250 are devices that host and display user interfaces. For instance, the user device 240 is a mobile device that hosts one or more native applications (e.g., the smart home application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a smart home application 242. The smart home application 242 refers to a software/firmware program running on the corresponding mobile device that enables the user interface and features described throughout. The user device 240 may load or install the smart home application 242 based on data received over a network or data received from local media. The smart home application 242 runs on mobile devices platforms, such as iPhone, iPod touch, Blackberry, Google Android, Windows Mobile, etc. The smart home application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the control unit 210 over the network 205. The user device 250 may be configured to display a smart home user interface 252 that is generated by the user device 250 or generated by the monitoring application server 260. For example, the user device 250 may be configured to display a user interface (e.g., a web page) provided by the monitoring application server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240 and 250 communicate with and receive monitoring system data from the control unit 210 using the communication link 238. For instance, the one or more user devices 240 and 250 may communicate with the control unit 210 using various local wireless protocols such as Wi-Fi, Bluetooth, Zwave, Zigbee, HomePlug (ethernet over powerline), or wired protocols such as Ethernet and USB, to connect the one or more user devices 240 and 250 to local security and automation equipment. The one or more user devices 240 and 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 and 250 are shown as communicating with the control unit 210, the one or more user devices 240 and 250 may communicate directly with the sensors and other devices controlled by the control unit 210. In some implementations, the one or more user devices 240 and 250 replace the control unit 210 and perform the functions of the control unit 210 for local monitoring and long range/offsite communication.

In other implementations, the one or more user devices 240 and 250 receive monitoring system data captured by the control unit 210 through the network 205. The one or more user devices 240, 250 may receive the data from the control unit 210 through the network 205 or the monitoring application server 260 may relay data received from the control unit 210 to the one or more user devices 240 and 250 through the network 205. In this regard, the monitoring application server 260 may facilitate communication between the one or more user devices 240 and 250 and the monitoring system.

In some implementations, the one or more user devices 240 and 250 may be configured to switch whether the one or more user devices 240 and 250 communicate with the control unit 210 directly (e.g., through link 238) or through the monitoring application server 260 (e.g., through network 205) based on a location of the one or more user devices 240 and 250. For instance, when the one or more user devices 240 and 250 are located close to the control unit 210 and in range to communicate directly with the control unit 210, the one or more user devices 240 and 250 use direct communication. When the one or more user devices 240 and 250 are located far from the control unit 210 and not in range to communicate directly with the control unit 210, the one or more user devices 240 and 250 use communication through the monitoring application server 260.

Although the one or more user devices 240 and 250 are shown as being connected to the network 205, in some implementations, the one or more user devices 240 and 250 are not connected to the network 205. In these implementations, the one or more user devices 240 and 250 communicate directly with one or more of the monitoring system components and no network (e.g., Internet) connection or reliance on remote servers is needed.

In some implementations, the one or more user devices 240 and 250 are used in conjunction with only local sensors and/or local devices in a house. In these implementations, the system 200 only includes the one or more user devices 240 and 250, the sensors 220, the module 222, the camera 230, and the robotic devices. The one or more user devices 240 and 250 receive data directly from the sensors 220, the module 222, the camera 230, and the robotic devices and sends data directly to the sensors 220, the module 222, the camera 230, and the robotic devices. The one or more user devices 240, 250 provide the appropriate interfaces/processing to provide visual surveillance and reporting.

In other implementations, the system 200 further includes network 205 and the sensors 220, the module 222, the camera 230, the thermostat 234, and the robotic devices are configured to communicate sensor and image data to the one or more user devices 240 and 250 over network 205 (e.g., the Internet, cellular network, etc.). In yet another implementation, the sensors 220, the module 222, the camera 230, the thermostat 234, and the robotic devices (or a component, such as a bridge/router) are intelligent enough to change the communication pathway from a direct local pathway when the one or more user devices 240 and 250 are in close physical proximity to the sensors 220, the module 222, the camera 230, the thermostat 234, and the robotic devices to a pathway over network 205 when the one or more user devices 240 and 250 are farther from the sensors 220, the module 222, the camera 230, the thermostat 234, and the robotic devices. In some examples, the system leverages GPS information from the one or more user devices 240 and 250 to determine whether the one or more user devices 240 and 250 are close enough to the sensors 220, the module 222, the camera 230, the thermostat 234, and the robotic devices to use the direct local pathway or whether the one or more user devices 240 and 250 are far enough from the sensors 220, the module 222, the camera 230, the thermostat 234, and the robotic devices that the pathway over network 205 is required. In other examples, the system leverages status communications (e.g., pinging) between the one or more user devices 240 and 250 and the sensors 220, the module 222, the camera 230, the thermostat 234, and the robotic devices to determine whether communication using the direct local pathway is possible. If communication using the direct local pathway is possible, the one or more user devices 240 and 250 communicate with the sensors 220, the module 222, the camera 230, the thermostat 234, and the robotic devices using the direct local pathway. If communication using the direct local pathway is not possible, the one or more user devices 240 and 250 communicate with the sensors 220, the module 222, the camera 230, the thermostat 234, and the robotic devices using the pathway over network 205.

In some implementations, the system 200 provides end users with access to images captured by the camera 230 to aid in decision making. The system 200 may transmit the images captured by the camera 230 over a wireless WAN network to the user devices 240 and 250. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "Away" state, but set not to capture images when the alarm system is armed in a "Stay" state or disarmed. In addition, the camera 230 may be triggered to begin capturing images when the alarm system detects an event, such as an alarm event, a door-opening event for a door that leads to an area within a field of view of the camera 230, or motion in the area within the field of view of the camera 230. In other implementations, the camera 230 may capture images continuously, but the captured images may be stored or transmitted over a network when needed.

Figure 3:
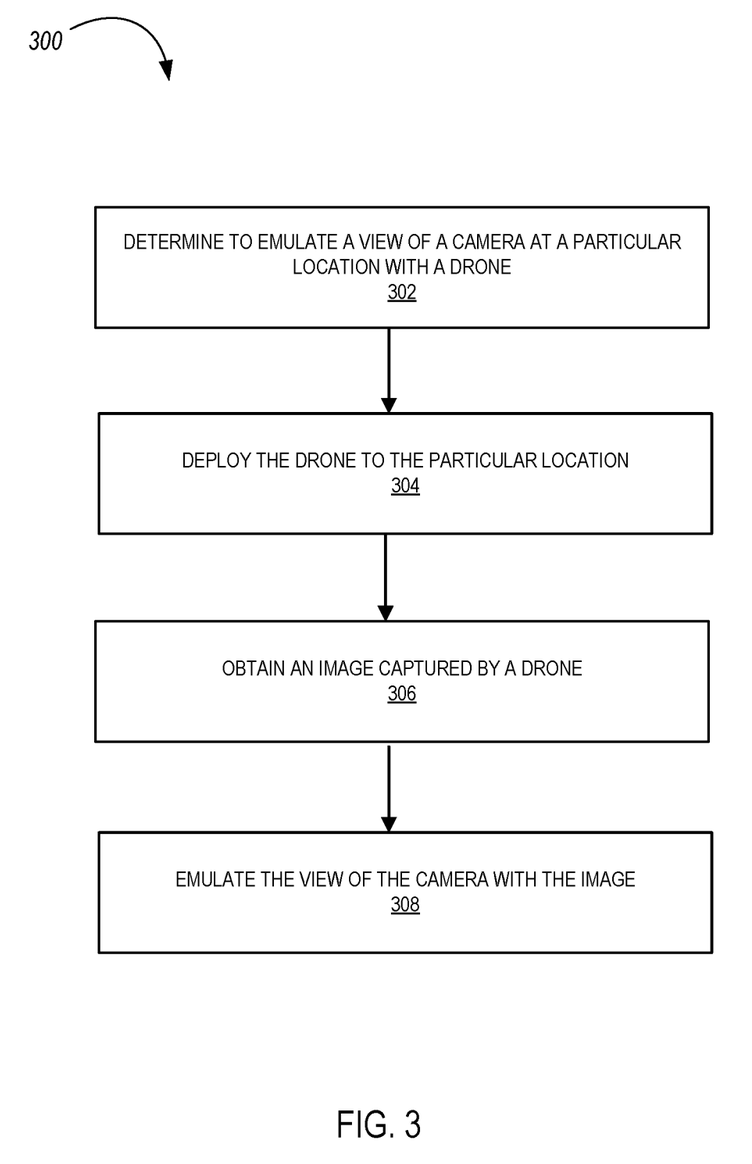
FIG. 3 is a flowchart of an example process for drone navigation within a property.

FIG. 3 is a flowchart of an example process 300 for drone navigation within a property. The process 300 may be performed entirely or in part by one or more of the drone 116, the control unit server 104, or a client device 148. Briefly, and as well described in more detail below, the process 300 includes determining to emulate a view of a camera at a particular location with a drone, deploying the drone to the particular location, obtaining an image captured by a drone, and emulating the view of the camera with the image.

The process 300 includes determining to emulate a view of a camera at a particular location with a drone (302). For example, the control unit server 104 may receive a request from a user to preview what a particular model of camera would show from a particular corner in the kitchen. In another example, the client device 148 may receive selections in a graphical user interface and, based on the selections, determine to emulate what a particular model of camera would show from a particular corner in the kitchen.

In some implementations, determining to emulate a view of a camera at a particular location with a drone includes receiving an indication of a model of the camera and receiving an indication of a position in a 3D map that corresponds to the particular location. For example, the control unit server 104 may receive an installation plan that indicates that a first model of camera be included in a first corner of the kitchen and a second model of camera be included in a second corner of the kitchen and, in response, determine to emulate the views of the respective models of cameras at the respective corners.

In another example, in a graphical user interface, a user may select a particular model of camera from a drop down list and select a specific location shown in a 3D map and, in response, the control unit server 104 may receive a request to emulate a specific camera at a specific location. In yet another example, the control unit server 104 may receive an installation plan that indicates that a first model of camera be included in a first corner of the kitchen and a second model of camera be included in a second corner of the kitchen and, in response, determine to emulate the views of the respective models of cameras at the respective corners.

The process 300 includes deploying the drone to the particular location (304). For example, the control unit server 104 may instruct the drone 116 to fly to the particular corner of the kitchen. In another example, the client device 148 may instruct the drone to fly to the particular corner of the kitchen.

The process 300 includes obtaining an image captured by a drone (306). For example, the control unit server 104 may receive video from the drone 116 that includes multiple sequential images captured when the drone 116 has reached the particular corner of the kitchen. In another example, the client device 148 may receive video from the drone 116 that includes multiple sequential images captured when the drone 116 has reached the particular corner of the kitchen.

The process 300 includes emulating the view of the camera with the image (308). For example, the control unit server 104 may modify the image to make it appear as if it were captured by the camera and then transmit the modified image to the client device 148 for display to a user. In another example, the client device 148 may modify the image and then display the modified image to the user.

In some implementations, emulating the view of the camera with the image includes determining characteristics of the camera to emulate and generating an emulated image based on both the image and the characteristics of the camera to emulate. For example, the control unit server 104 may determine characteristics of a camera and then modify the image from the drone 116 to make the image appear as if it were captured with the characteristics of the camera.

In some implementations, generating an emulated image based on both the image and the characteristics of the camera to emulate includes generating the emulated image based on at least one of an angle of coverage, a resolution, or distortion of the camera. For example, the client device 148 may determine an angle of coverage of 90 degrees and a resolution of 1080p and, in response, reduce an amount of the image shown and a size of the image if the drone 116 has a camera with 99 degrees angle of cover and a resolution of 4K.

In some implementations, determining characteristics of the camera to emulate includes identifying a model of the camera and identifying at least one of the angle of coverage, the resolution, or the distortion of the camera based on the model of the camera based on a mapping of models of cameras to respective characteristics of the models of cameras. For example, the control unit server 104 may store a table with rows that each map a respective model of camera to respective characteristics and, in response to a request to emulate a model of camera, find the row for that model in the table and then identify the characteristics specified in the row.

In some implementations, generating an emulated image based on both the image and the characteristics of the camera to emulate includes determining that the angle of coverage of a camera in the drone is less than the angle of coverage of the camera to emulate, based on determining that the angle of coverage of the camera in the drone is less than the angle of coverage of the camera to emulate, obtaining a second image captured by the drone after at least one of the drone or the camera in the drone is rotated, and generating the emulated image from the image and the second image. For example, the client device 148 may determine that the drone's camera has less angle of coverage so multiple images from the drone's camera need to be stitched together to emulate a single image and, in response, pan and tilt the drone's camera to obtain different images to stitch together.

In some implementations, generating an emulated image based on both the image and the characteristics of the camera to emulate includes determining that the resolution a camera in the drone is less than the resolution the camera to emulate, based on determining that the resolution a camera in the drone is less than the resolution the camera to emulate, obtaining a second image captured by the drone after the drone is moved, and generating the emulated image from the image and the second image. For example, the client device 148 may determine that the drone's camera has less resolution than the camera so multiple images from the drone's camera need to be stitched together to emulate a single image and, in response, move the drone closer toward the center of the kitchen to obtain different images that show more details to stitch together.

In some implementation, the process 300 includes providing an emulated image for display to a user. For example, the client device 148 may display the emulated image on a display of the client device 148 or the control unit server 104 may provide the emulated image to the client device 148 for display.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer implemented method comprising:
   determining to emulate a view of a camera at a particular location with a drone;
   deploying the drone to the particular location;
   obtaining an image captured by the drone; and
   emulating the view of the camera with the image, the emulating comprising:
   identifying data indicating a model of the camera;
   identifying, using the data indicating the model of the camera and a mapping of models of cameras to respective characteristics of the models of cameras, at least one of an angle of coverage, a resolution, or a distortion of the camera; and
   generating an emulated image using both a) the image and b) the at least one of the angle of coverage, the resolution, or the distortion of the camera.

2. The method of claim 1, wherein generating the emulated image using both a) the image and b) the at least one of the angle of coverage, the resolution, or the distortion of the camera comprises:
   determining that the angle of coverage of a camera in the drone is less than the angle of coverage of the camera to emulate;

in response to determining that the angle of coverage of the camera in the drone is less than the angle of coverage of the camera to emulate, obtaining a second image captured by the drone after at least one of the drone or the camera in the drone is rotated; and
generating the emulated image from the image and the second image.

3. The method of claim 1, wherein generating the emulated image using both a) the image and b) the at least one of the angle of coverage, the resolution, or the distortion of the camera comprises:
determining that the resolution a camera in the drone is less than the resolution the camera to emulate;
in response to determining that the resolution a camera in the drone is less than the resolution the camera to emulate, obtaining a second image captured by the drone after the drone is moved; and
generating the emulated image from the image and the second image.

4. The method of claim 1, wherein emulating the view of the camera with the image is performed by a control unit server.

5. The method of claim 1, wherein emulating the view of the camera with the image is performed by the drone.

6. The method of claim 1, wherein determining to emulate a view of a camera at a particular location with the drone comprises:
receiving an indication of a model of the camera; and
receiving an indication of a position in a 3D map that corresponds to the particular location.

7. The method of claim 1, comprising:
providing an emulated image for display to a user.

8. A system comprising:
one or more computers and one or more storage devices storing instructions that are operable, when executed by the one or more computers, to cause the one or more computers to perform operations comprising:
determining to emulate a view of a camera at a particular location with a drone;
deploying the drone to the particular location;
obtaining an image captured by the drone; and
emulating the view of the camera with the image, the emulating comprising:
identifying data indicating a model of the camera;
identifying, using the data indicating the model of the camera and a mapping of models of cameras to respective characteristics of the models of cameras, at least one of an angle of coverage, a resolution, or a distortion of the camera; and
generating an emulated image using both a) the image and b) the at least one of the angle of coverage, the resolution, or the distortion of the camera.

9. The system of claim 8, wherein generating the emulated image using both a) the image and b) the at least one of the angle of coverage, the resolution, or the distortion of the camera comprises:
determining that the angle of coverage of a camera in the drone is less than the angle of coverage of the camera to emulate;
in response to determining that the angle of coverage of the camera in the drone is less than the angle of coverage of the camera to emulate, obtaining a second image captured by the drone after at least one of the drone or the camera in the drone is rotated; and
generating the emulated image from the image and the second image.

10. The system of claim 8, wherein generating the emulated image using both a) the image and b) the at least one of the angle of coverage, the resolution, or the distortion of the camera comprises:
determining that the resolution a camera in the drone is less than the resolution the camera to emulate;
in response to determining that the resolution a camera in the drone is less than the resolution the camera to emulate, obtaining a second image captured by the drone after the drone is moved; and
generating the emulated image from the image and the second image.

11. The system of claim 8, wherein emulating the view of the camera with the image is performed by a control unit server.

12. The system of claim 8, wherein emulating the view of the camera with the image is performed by the drone.

13. The system of claim 8, wherein determining to emulate a view of a camera at a particular location with a drone comprises:
receiving an indication of a model of the camera; and
receiving an indication of a position in a 3D map that corresponds to the particular location.

14. A non-transitory computer-readable medium storing software comprising instructions executable by one or more computers which, upon such execution, cause the one or more computers to perform operations comprising:
determining to emulate a view of a camera at a particular location with a drone;
deploying the drone to the particular location;
obtaining an image captured by the drone; and
emulating the view of the camera with the image, the emulating comprising:
identifying data indicating a model of the camera;
identifying, using the data indicating the model of the camera and a mapping of models of cameras to respective characteristics of the models of cameras, at least one of an angle of coverage, a resolution, or a distortion of the camera; and
generating an emulated image using both a) the image and b) the at least one of the angle of coverage, the resolution, or the distortion of the camera.

15. The computer-readable medium of claim 14, wherein generating the emulated image using both a) the image and b) the at least one of the angle of coverage, the resolution, or the distortion of the camera comprises:
determining that the angle of coverage of a camera in the drone is less than the angle of coverage of the camera to emulate;
in response to determining that the angle of coverage of the camera in the drone is less than the angle of coverage of the camera to emulate, obtaining a second image captured by the drone after at least one of the drone or the camera in the drone is rotated; and
generating the emulated image from the image and the second image.

16. The computer-readable medium of claim 14, wherein generating the emulated image using both a) the image and b) the at least one of the angle of coverage, the resolution, or the distortion of the camera comprises:
determining that the resolution a camera in the drone is less than the resolution the camera to emulate;
in response to determining that the resolution a camera in the drone is less than the resolution the camera to emulate, obtaining a second image captured by the drone after the drone is moved; and generating the emulated image from the image and the second image.

17. The computer-readable medium of claim 14, wherein emulating the view of the camera with the image is performed by a control unit server.

18. The computer-readable medium of claim 14, wherein emulating the view of the camera with the image is performed by the drone.

19. The computer-readable medium of claim 14, wherein determining to emulate a view of a camera at a particular location with the drone comprises:

receiving an indication of a model of the camera; and
receiving an indication of a position in a 3D map that corresponds to the particular location.

20. The computer-readable medium of claim 14, comprising:

providing an emulated image for display to a user.

* * * * *